United States Patent [19]

Stunzer et al.

[11] Patent Number: 5,261,484
[45] Date of Patent: Nov. 16, 1993

[54] DRUM FOR COOLING OR HEATING A PRODUCT

[75] Inventors: Norbert Stunzer, Leobendorf; Alfred Fritsch, Schrick, both of Austria

[73] Assignee: Santrade Ltd., Luzern, Switzerland

[21] Appl. No.: 936,309

[22] Filed: Aug. 28, 1992

[30] Foreign Application Priority Data

Sep. 7, 1991 [DE] Fed. Rep. of Germany ....... 4129815

[51] Int. Cl.[5] .................................................. F28F 5/02
[52] U.S. Cl. ........................................ 165/89; 34/124
[58] Field of Search ............... 165/89, 90; 34/119, 34/124

[56] References Cited

U.S. PATENT DOCUMENTS

| | | | |
|---|---|---|---|
| 2,964,297 | 12/1960 | Davis et al. | 165/89 |
| 3,325,910 | 6/1967 | Toivonen | 34/124 |
| 3,355,817 | 12/1967 | Birk | 34/124 |
| 3,406,748 | 10/1968 | Jarreby | 165/89 |
| 3,845,810 | 11/1974 | Gerding | 165/89 X |
| 4,498,527 | 2/1985 | Gerarts et al. | 165/89 |

FOREIGN PATENT DOCUMENTS

| | | |
|---|---|---|
| 611867 | 4/1935 | Fed. Rep. of Germany . |
| 842650 | 6/1952 | Fed. Rep. of Germany . |
| 940227 | 3/1956 | Fed. Rep. of Germany . |
| WO84/02573 | 7/1984 | PCT Int'l Appl. . |

Primary Examiner—Allen J. Flanigan
Attorney, Agent, or Firm—Burns, Doane, Swecker & Mathis

[57] ABSTRACT

A cylindrical drum exchanges heat between a process fluid sprayed against its inner surface, and a raw product applied to its outer surface. The drum is formed by a thin cylindrical strip which is mounted on two disks. The strip is stiff enough to resist sagging under its own weight. The disks are of smaller diameter than an inner surface of the drum, and a hollow inflatable ring is interposed between each disk and the drum to frictionally connect the drum to the disks for common rotation and form a fluid seal for the ends of the drum. The drum can be removed longitudinally from the disks.

17 Claims, 1 Drawing Sheet

1

DRUM FOR COOLING OR HEATING A PRODUCT

BACKGROUND OF THE INVENTION

The present invention relates to methods and apparatus for exchanging heat between a process fluid and a raw product.

It is conventional to employ a drum to subject a raw product to a continuous temperature-control process. This is effected by applying the raw product either upon the outer or inner face of the drum jacket, while a process fluid of higher or lower temperature, as compared with the raw product, is applied to the other face of the drum jacket at a charging station. As the raw product is moved from the charging station to a delivery station, due to the rotation of the drum jacket, it is influenced by the temperature of the process fluid, i.e., by heat transmission through the cross-section of the jacket, without directly contacting the process fluid. It is thereby possible, for example, to dry a raw product by the use of process fluid of higher temperature, or to cool, crystallize or freeze a product by a cooler process fluid.

It has been known heretofore to use for this purpose drums having a solid welded or cast drum jacket, the wall thickness of which is selected as a function of the demands placed on strength. A cooling drum of this type, which is used for making ice-cream, has been disclosed in German Patent Specification No. 940 227. The drum according to this disclosure comprises a vaporizer/condenser unit arranged inside the drum jacket. A cooling-coil line connected to the drum jacket extends along the inside thereof and contains the circulating process fluid, i.e., a cooling agent. Water applied to the outside of the drum jacket freezes thereon until it reaches a delivery station, due to the rotation of the drum, where the resulting ice is removed from the outside of the drum jacket and is crushed.

In order that the known drums are sufficiently strong, e.g., to avoid sagging, they possess a relatively large wall thicknesses which is detrimental to the heat transmission properties. In addition, drums of this type have a relatively high inherent weight. Also, the structure of a drum jacket is adapted for a specific raw product, so it cannot easily be converted to treat a different product.

From German Patent Specification No. 611 867 it has been known to provide a drum which is equipped with an exchangeable cover made from a suitable material such as rubber, rubber composition, felt, or the like. This cover, which is designed as a seamless hollow cylinder, is mounted on the drum by means of tensioning members provided on the end faces of the drum and comprising segments adapted to tension and detachably hold the cover. However, the cover must be supported on its inside by suitable segment-shaped jacket sections to prevent sagging. Thus, it is not possible in this way to provide a drum which is suited for heat transmission between its inside and its outside, and whose interior space is sealed.

SUMMARY OF A PREFERRED EMBODIMENT OF THE INVENTION

It is an object of the present invention to provide a drum of the kind described above which, while providing effective heat transmission and possessing a relatively low weight, can be converted in a simple way for use with different raw products.

This object is achieved by a drum formed by a thin strip of endless circumference defining a longitudinal axis about which the drum is rotatable. The strip is of sufficient stiffness along its length to resist sagging under its own weight. The strip forms inner and outer surfaces. One of the surfaces is adapted to receive a process fluid, and the other surface is adapted to receive the raw product at a different temperature than the process fluid so that heat is exchanged therebetween through the strip. A pair of end disks are disposed at opposite ends of the strip and positioned such that the strip and each end disk forms therebetween a space extending in a lateral direction with reference to the axis. A mounting structure is disposed in each of the spaces for mounting the strip to the disks in a manner transmitting rotation of the disks to the strip, and permitting the strip to be removed from the disks in a longitudinal direction.

The endless strip serving as a drum jacket has a smaller wall thickness and lower weight, as compared with the thick, rigid prior art drum jacket mentioned earlier. The disks on both ends of the drum hold the endless strip in sealed relationship. Release of the endless strip is possible without any problem, whereafter it can be pulled off easily, having a somewhat greater circumferential length than the disks. Thus, it is easily possible, if necessary, to exchange the mounted endless strip for another endless strip suited for processing a different raw product, without the need to mount a completely new drum arrangement. The material from which the endless strip can be formed comprises a great variety of different materials, such as stainless steel, carbon steel, copper, nickel, titanium, or a plastic material.

Preferably, the mounting structure which mounts the strip to the disks comprises a pneumatically expandable endless hollow sealing ring extending around the outer circumference of each disk. Such a hollow sealing ring is capable, once it is inflated, of exerting upon the endless strip an outwardly acting tensioning force, which is uniformly distributed over the whole circumference. By subsequently venting the rings, the tight frictional connection between the disks and the endless strip can be released, whereafter the endless strip can be pulled off the disks and exchanged for a different one to perform a heat transfer operation on a different material. In order to achieve a uniform and elastic contact between the hollow sealing rings and the endless strip, rings made from an elastic endless vulcanized material are preferred.

In the inflated condition of the hollow tube, the radially outer surface thereof is approximately straight and extending in the direction of the axis of rotation. That surface is preferably provided with longitudinally spaced grooves. The hollow sealing rings, once inflated, establish a broad-surface contact with the endless strip by their substantially straight outer surface. This leads to a high adhesion coefficient between the endless strip and the hollowing sealing ring, and results in a reliable non-slipping and sealing connection between the endless strip and the tensioning disks in both the axial and circumferential directions. The connection is enhanced by profiling the rings with the grooves as mentioned above.

It is further of advantage to equip the outer circumference of each disk with a radial groove for receiving the hollow sealing ring. This has the effect of securing and fixing the hollow sealing rings on the disks, especially against lateral dislodgement.

According to a further aspect of the invention, the disks are supported to rotate about a fixed drum axle so that the drum axle as such does not have to perform a rotary movement. It is then preferred, and also easily possible, to provide the drum axle with hollow channels and to guide the process fluid through the latter into the interior of the drum and back to the outside. A stationary spray system mounted to the axle within the drum enables the process fluid to be applied to the inner surface of the drum jacket. A particularly advantageous system for removing the process fluid from the drum involves producing an over pressure in the interior of the drum, so that the process fluid is forced from the interior of the drum through discharge pipes.

In another aspect of the invention, one or ore supporting rollers are provided, each bearing against the drum jacket at a point opposite a charging and/or delivery station arranged on the other side of the drum jacket. The supporting rollers oppose the pressure forces, if any, acting at the charging or delivery station upon the comparatively thin endless strip.

BRIEF DESCRIPTION OF THE DRAWINGS

The objects and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

Figure 1:
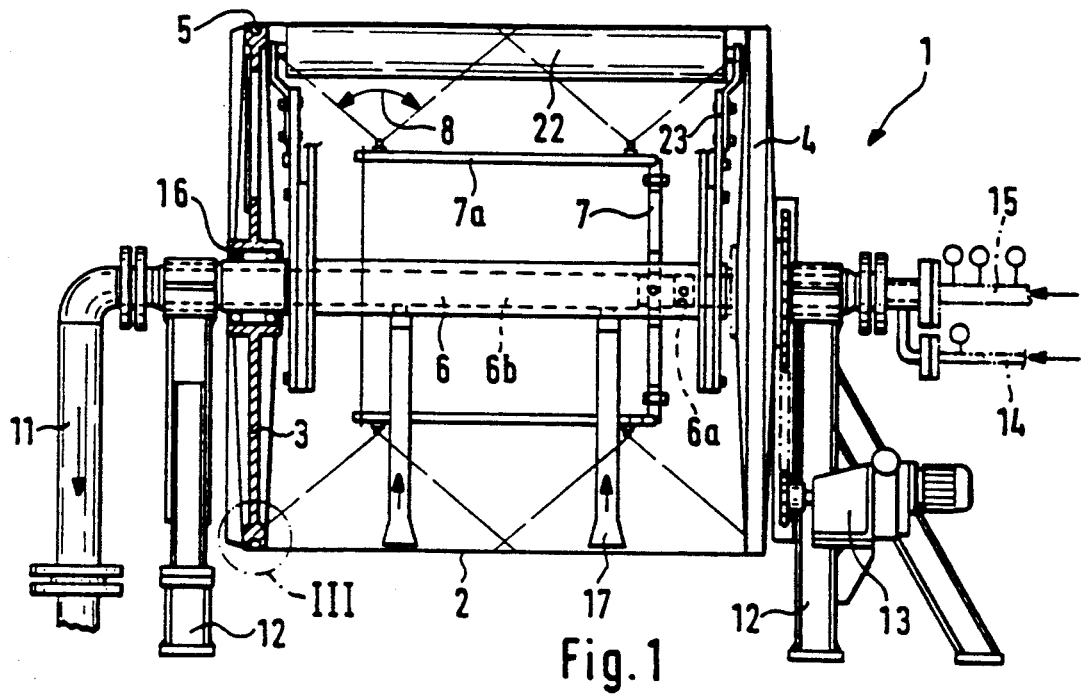
FIG. 1 is a longitudinal sectional view through a drum arrangement according to the present invention.

The drum 1 illustrated in the figures is rotatably mounted on a horizontal axle 6 which, in turn, is fixedly mounted on a base 12. The drum axle 6 as such remains stationary on the base 12 and comprises hollow channels 6a, 6b serving as supply and discharge channels for the process fluid. The process fluid is supplied into the unit in the direction indicated by the arrow through a lateral inlet 15, and is carried off on the opposite end through a discharge pipe 11. Depending on the particular application, the process fluid may be a cooling or a heating agent, for example steam or a thermal oil for heating, or liquid nitrogen or ammonia for cooling. Inside the drum, eight spray pipes 7a equipped with spray nozzles are distributed approximately equidistantly in the circumferential direction of the drum, approximately centrally between the drum axle 6 and a drum jacket. Every two spray pipes 7a are connected to a common T-shaped supply line 7 which is mounted by flanges on the drum axle 6 and which communicates with the respective hollow channel 6a, for the supply of the process fluid. The process fluid leaving the spray nozzles is applied as mutually overlapping spray cones 8 upon the radially inside surface 2a of a strip 2 serving as the drum jacket. The process fluid so sprayed upon the strip runs down along the inside surface 2a of the drum jacket, thereby heating or cooling the drum jacket 2 from the inside. Two siphon pipes 17, likewise mounted by flanges on the drum axle 6, extend downwardly from the drum axle 6 to points near the inside surface 2a of the drum jacket. The siphon pipes 17 communicate with the discharge pipe 11 via a corresponding hollow channel 6b in the drum axle 6. By producing an over pressure in the inside of the drum, which is effected by blowing compressed air through an inlet line 14, the process fluid collecting in the lower region is pushed upwardly and through the siphon pipes 17, and reaches the discharge pipe 11 through the hollow channel 6a in the drum axle 6, whereby the used process fluid is carried off from the inside of the drum jacket.

The drum jacket is constituted by a strip 2 which has an endless perimeter or circumference, in this case an endless circular circumference since it is of circular cylindrical shape. The strip 2 has a comparatively thin wall thickness, typically from 1.2 millimeters to 1.4 millimeters, and comprises an endless welded steel strip. It would of course also be possible to make the endless strip from a different metal or a plastic material. The endless strip 2 is mounted on two tensioning disks 3, 4 arranged on the drum ends. The disks 3, 4 are rotatably supported on the stationary drum axis 6 via bearings 16 for rotation about a longitudinal axis defined by the axle 6. A drive mechanism 13 sets the disks 3, 4 into a revolving motion, during which the mounted endless strip 2 is entrained by the disks, while the drum axle 6 as such remains stationary.

Figure 3:
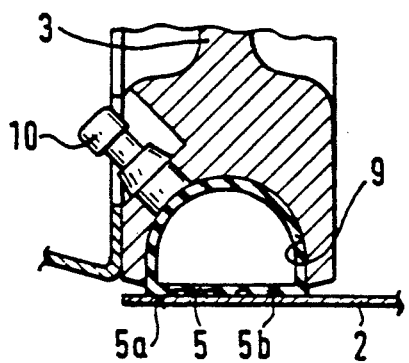
FIG. 3 is an enlarged fragmentary view of the area indicated by the circle 3.

The manner in which the mounted endless strip 2 is held on the disks 3, 4 can be seen best in the detail of FIG. 3. Each disk 3, 4 is provided, along its outer circumference, with a radial groove 9 of semi-circular cross-section. Each of these grooves 9 accommodates a profile in the form of a hollow sealing ring 5 whose radially inward edge is configured to match the shape of the groove 9. The hollow sealing profiles 5 comprise an elastic endless vulcanized material, and are inserted in the radial grooves 9 of the disks 3, 4 in the manner of a bicycle tube. A valve 10 serves for inflating, and venting the hollow sealing profile 5.

For mounting the endless strip 2, the latter while in its cylindrical form, is at first pulled axially over both disks 3, 4 and into the desired position. This is possible without any difficulty because the circumferential length (and thus the diameter) of the outer circumference of the disks 3, 4 is slightly smaller than the circumferential length (and diameter) of the inside surface 2a of the endless strip 2. Thereafter, an over pressure is produced in the hollow sealing profiles 5 of the two disks 3, 4 via the valve 10, whereby the seals are inflated. This is effected by means of compressed air, typically at a pressure of up to 10 bar. This has the effect that the radially outer surface 5a of each hollow seal 5 comes to project beyond the outer radius of the circular disks 3, 4 and the surface 5a comes to bear upon the endless strip 2 and to urge it in a radially outward direction, uniformly over its circumference. The uniform pressure over the whole circumference guarantees circular tensioning of the endless strip 2 and prevents longitudinal movement of the strip 2. In order to guarantee safe sealing between the inside and the outside of the drum, and perfect adhesion between the endless strip 2 and the hollow sealing profiles 5, the radially outer surface 5a of the hollow sealing profile 5 is generally straight in the axial direction of the drum (i.e., as viewed in cross-section in FIG. 3) and, thus, is parallel to the respective contact surface of the endless strip 2. In addition to the broad surface contact between the hollow sealing profile 5 and the endless strip 2 achieved thereby, the radial outside surface 5a of the hollow sealing profile 5 possesses an arrangement of circumferential grooves 5b spaced apart longitudinally in the longitudinal direction which further promotes the sealing and holding function. After inflation of the hollow sealing profiles 5, the endless strip 2 is held in non-slipping relationship in the axial and rotary directions, and the interior surface of the drum is held on the tensioning disks 3, 4 in a reliably sealed way.

Thus, the inflated hollow sealing profiles 5 serve the multiple functions of sealing the drum inside from the drum outside, of transmitting the torque from the tensioning disks 3, 4 to the endless strip 2, of providing a lateral guide for the endless strip 2, and of accommodating thermal extension of the endless strip 2.

On the outside surface 2b of the drum jacket 2, a charging station 19 and a delivery station 20 are arranged at a circumferential distance from the other. At the charging station 19, the raw product is applied upon the outside surface of the drum 2b. The heat transmission between the raw product applied to the outside surface and the process fluid sprayed upon the drum inside surface is effected while the tensioning disks 3, 4 and the endless strip 2 connected therewith rotate in the direction of rotation D. When the delivery station 20 is reached (in the illustrated embodiment it is located at a rotary angle of approximately 320° from the charging station 19) the finished heat-treated or cooled raw product is taken off the outside of the drum jacket 2b. Depending on the particular application, a doctor blade may be provided at the charging station and/or the delivery station, and a squeezing roller may be provided, if necessary, at the delivery station.

Figure 2:
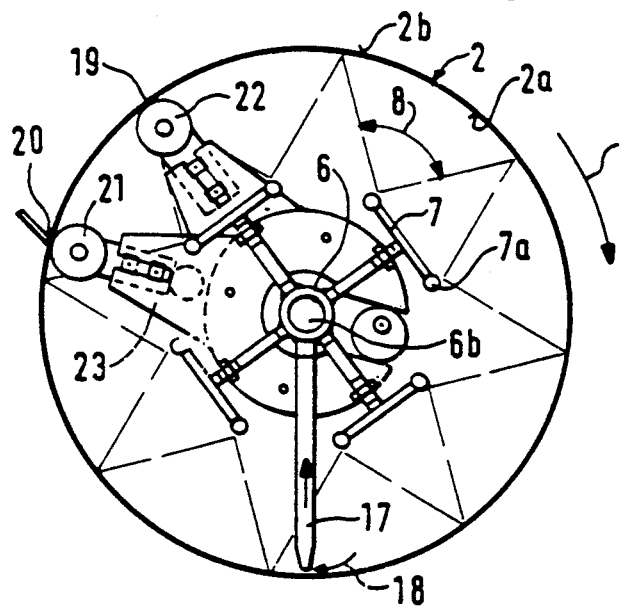
FIG. 2 is a cross-sectional view through the drum illustrated in FIG. 1.

The strip 2 is sufficiently stiff to avoid sagging under its own weight. However, the application of external mechanical forces, e.g., at stations 19, 20 could cause the strip to be deformed. Accordingly, as can be seen in particular in FIG. 2, two supporting rollers 21, 22 are provided which are mounted on holders 23 that are affixed to the axle 6. The axes of rotation of the rollers 21, 22 are stationary and parallel. The two supporting rollers 21, 22 are each in contact with the inside surface 2a of the endless strip 2. One supporting roller 21 is arranged opposite the delivery station 20, and the other roller 22 opposite the charging station 19, thus compensating for any forces that may be exerted upon the comparatively thin endless strip 2 as the raw product is being charged or delivered. This feature prevents in a reliable manner any distortions of the endless strip 2 in the particularly sensitive areas of the charging station 19 and the delivery station 20, and avoids in particular any central inward deflection of the endless strip 2. This also prevents the connection of the endless strip 2 and the disks 3, 4 from deteriorating as a result of distortions of the endless strip 2. Given the fact that no mechanical forces act on the remaining circumferential area of the endless strip 2, there is no need for additional supporting rollers in these areas.

It should be stressed once more that in the case of the drum 1 according to the invention, only the disks 3, 4 and the endless strip 2 rotate about the drum axle 6, whereas the drum axle 6 as, the supply and discharge lines 15, 11 for the process fluid, and the spray system 7, 7a for spraying the process fluid, all remain stationary.

It is understood that it is also possible to apply the process fluid to the outside surface of the drum, and the raw product to the inside of the drum. In addition, it would be possible, instead of using the disclosed hollow sealing profile 5, to employ other means for mounting the endless strip 2, for example a plurality of spring elements spaced at equal distances about the circumference of the disks and acting in a radially outward direction, or fan-shaped disks the outer radius of which can be varied by a spreading motion produced by the drive.

A fact that should be emphasized is the simple way in which the novel drum can be adapted to different raw products. In that regard, after the hollow sealing profiles have been vented (deflated), the endless strip 2 is easily pulled off the tensioning disks and exchanged for another endless strip suited for a different raw product as regards its material and structure.

Although the present invention has been described in connection with a preferred embodiment of the invention, it will be appreciated by those skilled in the art that additions, substitutions, modifications and deletions not specifically described may be made without departing from the spirit and scope of the invention as defined in the appended claims.

What is claimed is:

1. Apparatus for exchanging heat between a process fluid and a raw product, comprising:
    a drum consisting of a single thin strip of endless loop shape defining a longitudinal axis about which said drum is rotatable,
        said strip being of sufficient stiffness along its length to resist sagging under its own weight,
        said strip forming radially inner and outer surfaces, one of said surfaces adapted to receive said process fluid, and the other surface adapted to receive said raw product at a different temperature than said process fluid, so that heat is exchanged therebetween through said strip,
    a pair of end disks disposed at opposite ends of said strip and positioned such that said strip and each end disk form therebetween a space extending in a lateral direction with reference to said axis, and
    an inflatable hollow ring disposed in each of said spaces for mounting said strip to said disks in a manner transmitting rotation of said disks to said strip, and permitting said strip to be removed from said disks in a longitudinal direction.

2. Apparatus according to claim 1, wherein said disks are situated inside of said strip such that each inflatable ring engages said inner surface of said strip and an outer surface of the respective disk.

3. Apparatus according to claim 1, wherein each inflatable ring forms a fluid seal between said strip and a respective disk.

4. Apparatus according to claim 1, wherein each inflatable ring is mounted on a respective disk and frictionally bears against said strip.

5. Apparatus according to claim 1 including a stationary hollow axle extending along said longitudinal axis within said drum for conducting process fluid, and spraying means mounted fixedly on said tube for spraying process fluid against a portion of said inner surface.

6. Apparatus according to claim 1 wherein said disks are rotably mounted on said axle.

7. Apparatus according to claim 5, wherein said axle includes internal inlet and outlet passage means for conducting process fluid into said drum and for conducting process fluid out of said drum.

8. Apparatus according to claim 7 including an outlet tube extending downwardly from said axle and connected to said outlet passage means for removing process fluid from a bottom of said drum.

9. Apparatus according to claim 8 including means for pressurizing the inside of said drum for forcing process fluid through said outlet tube.

10. Apparatus according to claim 1, wherein said raw product is applied to and removed from said outer surface of said strip at charging and delivery stations, there being a support disposed within said drum and arranged to bear against said inner surface of said strip at a location opposite at least one of said stations.

11. Apparatus according to claim 1, wherein said strip and disks are of cylindrical shape.

12. Apparatus for exchanging heat between a process fluid and a raw product, comprising:

a drum formed of a thin strip of endless loop shape defining a longitudinal axis about which said drum is rotatable,
    said strip being of sufficient stiffness along its length to resist sagging under its own weight,
    said strip forming radially inner and outer surfaces, one of said surfaces adapted to receive said process fluid, and the other surface adapted to receive said raw product at a different temperature than said process fluid, so that heat is exchanged therebetween through said strip,
a pair of end disks disposed at opposite ends of said strip and positioned such that said strip and each end disk form therebetween a space extending in a lateral direction with reference to said axis, and
mounting means disposed in each of said spaces for mounting said strip to said disks in a manner transmitting rotation of said disks to said strip, and permitting said strip to be removed from said disks in a longitudinal direction,
said raw product being applied to and removed from said outer surface of said strip at charging and delivery stations, there being a support disposed within said drum and arranged to bear against said inner surface of said strip at a location opposite at least one of said stations.

13. Apparatus according to claim 12, wherein said support comprises a roller rotatable about an axis extending parallel to said axis of said strip.

14. Apparatus for exchanging heat between a process fluid and a raw product, comprising:

a drum formed by a circular cylindrical strip defining a longitudinal axis about which said drum is rotatable,
    said strip being of sufficient stiffness to resist sagging under its own weight,
    said strip forming radially inner and outer cylindrical surfaces, said outer surface adapted to receive said raw product, and said inner surface adapted to receive said process fluid at a different temperature than said raw product so that heat is exchanged therebetween through said strip,
a pair of cylindrical disks disposed within said drum at opposite ends thereof, said inner surface of said strip being of larger diameter than an outer diameter of each disk, so that a radial space is disposed therebetween,
elastic mounting means mounted on each of said disks and compressed radially between said inner surface of said strip and said outer surface of its respective disk so as to frictionally engage said inner surface of said strip to connect said strip to said disks for common rotation, while permitting said strip to be longitudinally removed from said disks,
a stationary longitudinal axle extending along said axis, said axle forming internal inlet and outer passages,
said disks being rotatably mounted on said axle, and
spraying means mounted on said axle within said drum and being connected to said inlet passage for receiving process fluid and spraying said process fluid against said inner surface of said strip, said process fluid being removed from said drum through said outlet passage means,
said raw product being applied to, and removed from, said outer surface of said strip at charging and delivery stations, respectively, a support roller being mounted in said drum opposite at least one of said stations for engaging said inner surface and resisting deformation of said strip.

15. Apparatus according to claim 14, wherein each elastic mounting means comprises a hollow inflatable ring.

16. Apparatus for exchanging heat between a process fluid and a raw product, comprising:

a drum formed of a thin strip of endless loop shape defining a longitudinal axis about which said drum is rotatable,
    said strip being of sufficient stiffness along its length to resist sagging under its own weight,
    said strip forming radially inner and outer surfaces, one of said surfaces adapted to receive said process fluid, and the other surface adapted to receive said raw product at a different temperature than said process fluid, so that heat is exchanged therebetween through said strip,
a pair of end disks disposed at opposite ends of said strip and positioned such that said strip and each disk form therebetween a space extending in a lateral direction with reference to said axis, and
mounting means disposed in each of said spaces for mounting said strip to said disks in a manner transmitting rotation of said disks to said strip, and permitting said strip to be removed from said disks in a longitudinal direction,
each mounting means comprising an inflatable hollow ring arranged coaxially with said axis of rotation, said disks disposed inside of said strip, and said rings being radially disposed between radially opposing surfaces of said strip and disks, each ring including a radially outer surface which is generally straight when said ring is viewed in cross section, each of said outer surfaces of said ring including longitudinally spaced, circumferentially extending grooves.

17. Apparatus for exchanging heat between a process fluid and a raw product, comprising:

a drum formed of a thin strip of endless loop shape defining a longitudinal axis abut which said drum is rotatable,
    said strip being of sufficient stiffness along its length to resist sagging under its own weight,
    said strip forming radially inner and outer surfaces, one of said surfaces adapted to receive said process fluid, and the other surface adapted to receive said raw product at a different temperature than said process fluid, so that heat is exchanged therebetween through said strip,
a pair of end disks disposed at opposite ends of said strip and positioned such that said strip and each end disk form therebetween a space extending in a lateral direction with reference to said axis, and mounting means disposed in each of said spaces for mounting said strip to said disks in a manner transmitting rotation of said disks to said strip, and permitting said strip to be removed from said disks in a longitudinal direction, each mounting means comprising an inflatable hollow ring arranged coaxially with said axis of rotation, said disks disposed inside of said strip, and said rings being radially disposed between radially opposing surfaces of said strip and disks, each ring including a radially outer surface which is generally straight when said ring is viewed in cross section, each disk having a circumferential groove formed in its outer surface, a respective ring being mounted in said groove.

* * * * *